US012756131B2

(12) United States Patent
Oliver et al.

(10) Patent No.: US 12,756,131 B2
(45) Date of Patent: Oct. 6, 2026

(54) WIRE MANAGEMENT CONNECTOR WITH WIRE BENDING RELIEF FOR PLUG-IN TYPE ELECTRICAL WIRING DEVICES

(71) Applicant: EATON INTELLIGENT POWER LIMITED, Dublin (IE)

(72) Inventors: Jason Roy Oliver, Peachtree City, GA (US); Chuanchuan Zhuang, Shanghai (CN); Fengguo Zhang, Shanghai (CN); Robin Lu Guiquan, Dongguan (CN); Keith J. Zhang, Zhengzhou (CN); Ian Romeo, Atlanta, GA (US); Erik J. Gouhl, Fayetteville, GA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 302 days.

(21) Appl. No.: 18/529,493

(22) Filed: Dec. 5, 2023

(65) Prior Publication Data

US 2025/0183580 A1 Jun. 5, 2025

(51) Int. Cl.

| | |
|---|---|
| ***H01R 13/502*** | (2006.01) |
| ***H01R 13/70*** | (2006.01) |
| *H01H 9/02* | (2006.01) |
| *H01H 21/04* | (2006.01) |
| *H01H 21/12* | (2006.01) |

(Continued)

(52) U.S. Cl.

CPC ........... *H01R 13/502* (2013.01); *H01R 13/70* (2013.01); *H01H 9/02* (2013.01); *H01H 9/0264* (2013.01); *H01H 21/04* (2013.01); *H01H 21/12* (2013.01); *H01R 13/504* (2013.01); *H01R 13/5045* (2013.01); *H01R 13/506* (2013.01); *H01R 13/5812* (2013.01); *H01R 13/5816* (2013.01); *H01R 13/582* (2013.01); *H01R 13/5837* (2013.01); *H01R 13/5841* (2013.01); *H01R 13/66* (2013.01)

(58) Field of Classification Search

CPC .... H01R 13/502; H01R 13/70; H01R 13/504; H01R 13/5045; H01R 13/506; H01R 13/5812; H01R 13/5816; H01R 13/582; H01R 13/5837; H01R 13/5841; H01R 13/66; H01H 9/02; H01H 9/0264; H01H 21/04; H01H 21/12

See application file for complete search history.

(56) References Cited

FOREIGN PATENT DOCUMENTS

CN 206180272 U * 5/2017

* cited by examiner

*Primary Examiner* — Justin M Kratt

(74) *Attorney, Agent, or Firm* — Eckert Seamans Cherin & Mellott, LLC

(57) ABSTRACT

An improved wire management connector for conductors run to an electrical wiring device from a main circuit breaker or branch breaker within a building is disclosed. The connector is formed with multiple channels, with each channel having a conductor receiving opening formed at its top end. For each conductor, the first end of the conductor can be secured within the interior of the connector such that the rest of the conductor runs through the conductor receiving opening to the exterior of the connector through the channel. Each channel has a lateral width slightly wider than the diameter of a conductor. The depth and height of each channel is greater than the lateral width, enabling each conductor to move freely in the depth and height dimensions with a reduced risk of getting compressed when the connector and electrical wiring device are placed in a confined space, such as a wall box.

9 Claims, 6 Drawing Sheets

(51) Int. Cl.

| | |
|---|---|
| *H01R 13/504* | (2006.01) |
| *H01R 13/506* | (2006.01) |
| *H01R 13/58* | (2006.01) |
| *H01R 13/66* | (2006.01) |

WIRE MANAGEMENT CONNECTOR WITH WIRE BENDING RELIEF FOR PLUG-IN TYPE ELECTRICAL WIRING DEVICES

FIELD OF THE INVENTION

The disclosed concept relates generally to electrical wiring devices, and in particular, to devices that provide wire management for electrical conductors run to electrical wiring devices installed within building walls.

BACKGROUND OF THE INVENTION

At utility customer sites such as residential, commercial, and industrial buildings, electrical wiring devices are installed to enable users to safely access electrical wiring in order to control power to devices such as light fixtures or to provide a plug point for plug-in electrical devices. A utility customer site receives utility power from the electrical grid via a distribution line that is electrically connected to a main service panel at the customer site. The main service panel at the customer site includes a number of main circuit breakers, and conductors installed throughout the utility customer site are used to electrically connect electrical wiring devices to the main circuit breaker(s) either directly or via branch circuit breakers.

During the rough-in phase of constructing a new building, the main circuit breaker(s) and branch circuit breakers are installed, and it is usually preferable to run conductors from the circuit breakers to all of the individual sites in the building where electrical wiring devices are desired prior to putting up drywall. That is, prior to putting up drywall, a wall box can be installed at each site to which conductors have been run, and the conductors at a given site can be inserted into the interior of the wall box, thus enabling the conductors to be accessed through the wall box when it is time to install an electrical wiring device such as a snap switch or electrical receptacle in the wall box.

When it is desired to have wire management within a wall box so that the conductors are not loose and unorganized within the wall box, a wire management arrangement can be used to contain the conductors and connect the electrical wiring device to the conductors. The component of the wire management arrangement that is used to contain the loose ends of the conductors is referred to as a connector. There is typically relatively little free space within a wall box after a wire management arrangement is inserted into the wall box. As a result, the conductors within the wall box can get bent or strained in ways that compromise the structural integrity of the conductors.

There is thus room for improvement in connectors for wire management arrangements intended for use with electrical wiring device installations.

SUMMARY OF THE INVENTION

These needs, and others, are met by an improved wire management connector for electrical wiring devices. The connector comprises a plurality of channels structured to receive conductors, with each channel having a lateral width slightly greater than the diameter of a conductor, a height greater than its lateral width, and a depth greater than its lateral width. The relative proportions of the height and depth of the channels relative to the diameter of the conductors enables the conductors to move relatively freely in the height and depth dimensions with a reduced risk of the conductors being compressed or otherwise strained when the wire management arrangement is inserted into a confined space, such as a wall box.

In accordance with one aspect of the disclosed concept, a connector is structured to provide wire management for a plurality of conductors electrically connected to a power source and to electrically connect an electrical wiring device to the plurality of conductors. The connector comprises a solid body that includes a plurality of channels, with the solid body being formed from solid material. Each channel is a gap in the solid material and is surrounded by a channel wall. Each gap extends upward from a bottom end of the connector in a top to bottom dimension such that a height of each channel is less than a length of the connector in the top to bottom dimension. A conductor receiving opening is formed in each channel wall, and each conductor receiving opening is structured to receive a first end of each conductor. The connector is structured to secure the first end of each conductor within an interior of the connector. For each channel, the height of the channel is greater than a lateral width of the channel, and the depth of the channel is greater than the lateral width of the channel.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
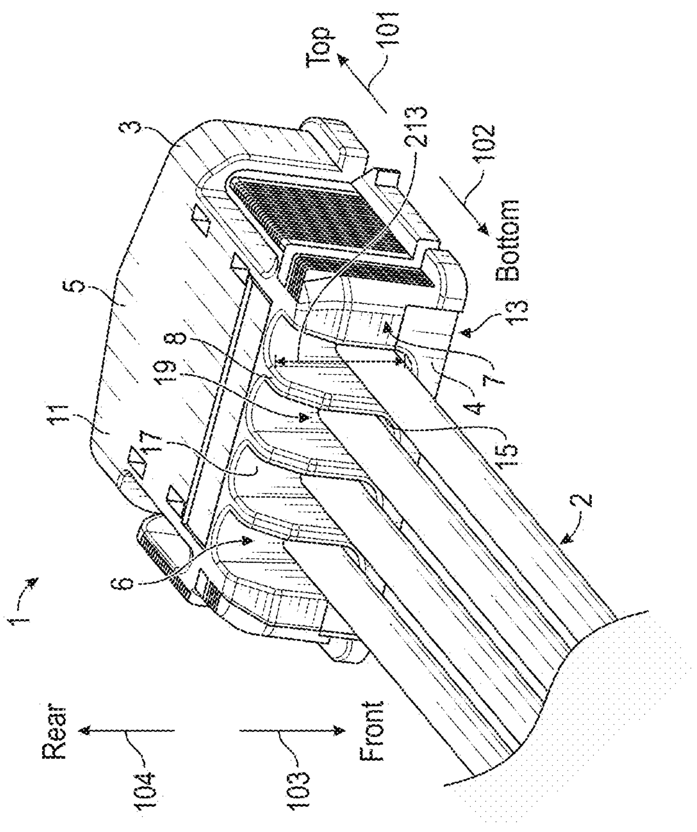
FIG. 1 is a partial isometric view of the bottom and rear side of an improved wire management connector for use with electrical wiring devices, in accordance with an example embodiment of the disclosed concept

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As employed herein, the term "electrical wiring device" refers to a point of connection that enables an electrical device to connect to the electrical grid.

As employed herein, when ordinal terms such as "first" and "second" are used to modify a noun, such use is simply intended to distinguish one item from another, and is not intended to require a sequential order unless specifically stated.

As employed herein, the term "number" shall mean one or an integer greater than one (i.e., a plurality).

Figure 2:
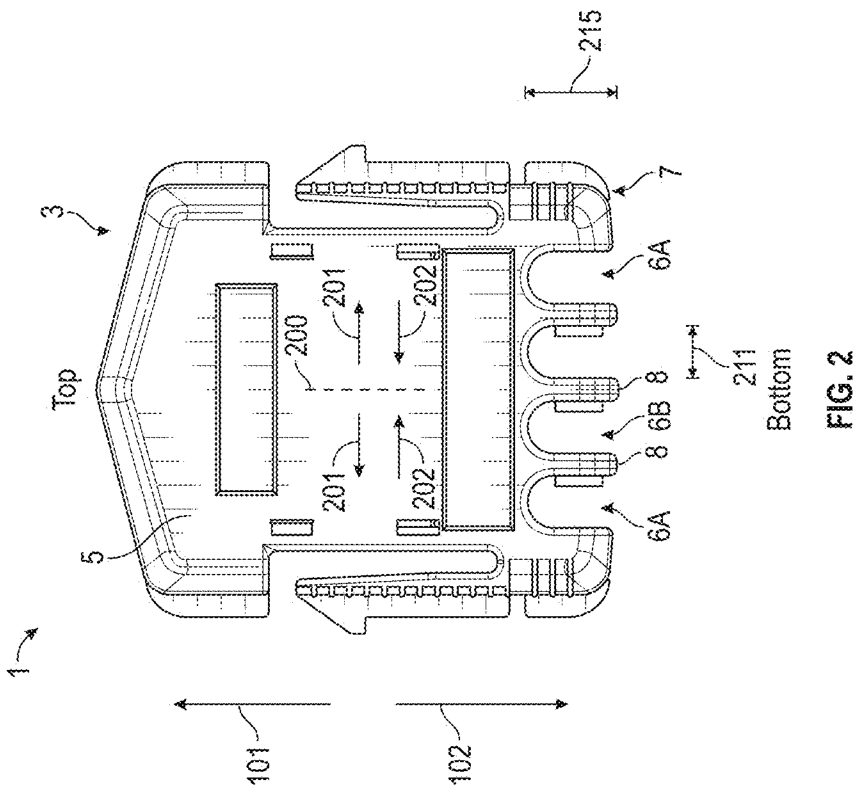
FIG. 2 is a rear elevation view of a main compartment of the wire management connector shown in FIG. 1, in accordance with an example embodiment of the disclosed concept.
Figure 3:
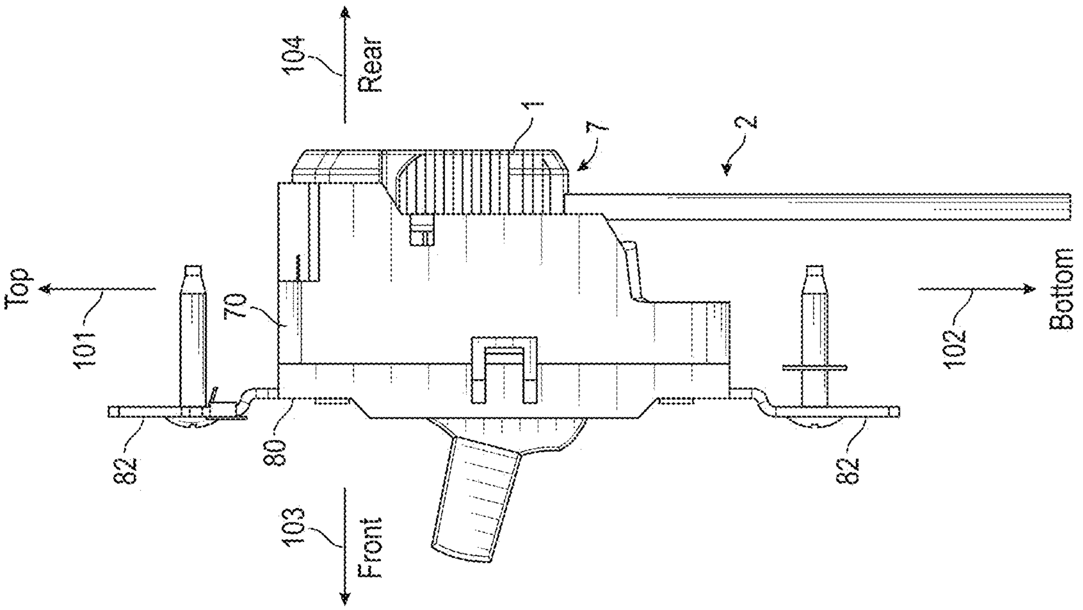
FIG. 3 is a side elevation view of an arrangement comprising an electrical wiring device faceplate coupled to a wire management structure that includes a housing and the wire management connector shown in FIG. 1.

FIG. 1 is a partial isometric view of the bottom and rear side of a wire management connector 1, in accordance with an example embodiment of the disclosed concept. FIG. 2 shows a rear elevation view of a main compartment 3 of the wire management connector 1 shown in FIG. 1, in accordance with an example embodiment of the disclosed concept. FIG. 3 is a side elevation view of an arrangement comprising an electrical wiring device faceplate coupled to a wire management structure that includes the wire management connector 1 shown in FIG. 1. The structural features of the disclosed wire management connector 1 will be detailed in conjunction with FIGS. 1, 2, and 3. Hereinafter, the wire management connector 1 is referred to as the "connector 1" for brevity.

The connector 1 is structured to provide wire management for an electrical wiring device (such as the snap switch wiring device 80 shown in FIG. 3) when the electrical wiring device is connected to conductors wired to supply power from a power source (e.g. the electrical grid) in a building. Specifically, in a building, when conductors are run from a main circuit breaker or branch breaker to a site in the building where it is intended that an electrical wiring device will be installed in a wall, the connector 1 helps to organize and contain the conductors that are run from the main or branch circuit breaker to the site of the electrical wiring device. In FIGS. 2 and 3, the connector 1 is shown containing a plurality of several such conductors 2.

As a preliminary matter, it is noted that there are four directions/orientations indicated throughout the figures: "top", "bottom", "front", and "rear". FIGS. 2-6 have all four directions indicated, while FIG. 2 has only the "top" and "bottom" directions indicated. The four directions/orientations indicated in the figures are used hereinafter to describe the various sides of the connector 1, as well as sides of the other components shown in the figures. The directions "top", "bottom", "front", and "rear" correspond to the orientation of the connector 1 and associated electrical wiring device as shown in FIGS. 3-6 and are used to simplify the description of the disclosed connector 1 and other components shown in the figures, but it will be appreciated that the functionality of the wire management connector 1 and other components does not change when the components are rotated relative to the orientation shown in FIGS. 3-6.

In addition, movement or orientation toward the "top" direction as indicated by the arrow 101 in FIGS. 1-6 can be described as "upward". Movement or orientation toward the "bottom" direction as indicated by the arrow 102 in FIGS. 1-6 can be described as "downward". Movement or orientation toward the "front" direction as indicated by the arrow 103 in FIGS. 2-6 can be described as "frontward". Movement or orientation toward the "rear" direction as indicated by the arrow 104 in FIGS. 2-6 can be described as "rearward". For clarity and as context necessitates, each of the reference numbers 101, 102, 103, 104 is sometimes used herein by inserting the reference number after an associated directional term. In one non-limiting example, movement of a component in the upward direction 101 may be described as "movement upward 101" or "upward 101 movement" (as opposed to using the phrase "movement in the upward direction 101").

Lastly, in FIG. 2, a central axis 200 of the connector 1 is numbered, with the central axis 200 extending in the top to bottom dimension. In an exemplary embodiment of the connector 1, the connector 1 is symmetrical about the central axis 200. Movement or orientation coincidental with or parallel to the central axis 200 can be referred to as "axial". It is noted that both upward 101 movement/orientation and downward 102 movement/orientation are axial. Movement or orientation away from the central axis 200 and in the direction indicated by the arrows 201 in FIG. 2 (i.e. orthogonal to the central axis 200) is described hereinafter as "lateral". Conversely, movement or orientation toward the central axis 200 and in the direction indicated by the arrows 202 in FIG. 2 (i.e. also orthogonal to the central axis 200) is described hereinafter as "medial". It is noted that the lateral and medial directions/orientations 201 and 202 are also orthogonal to the frontward and rearward directions/orientations denoted by the arrows 103 and 104 in FIGS. 2 and 3.

Continuing to refer to FIGS. 1-3 and to FIG. 1 in particular, the connector 1 comprises a main compartment 3 and a front cover 4 (the front cover 4 being partially visible and shown only in FIG. 1). The main compartment 3 and the front cover 4 shown in the figures are manufactured separately and then fixedly coupled to one another. As discussed later herein, the fully assembled connector 1 includes a plurality of electrical contacts (not visible in the figures) disposed in the interior of the connector 1, so that each conductor 2 inserted into the interior of the connector 1 can be electrically connected to one of the electrical contacts. Manufacturing the main compartment 3 and the front cover 4 as two separate components rather than manufacturing the connector 1 as one unitary body makes it easier to affix the electrical contacts within the interior of the connector 1. However, it is noted that the connector 1 can be manufactured as one unitary body instead without departing from the scope of the disclosed concept.

Still referring to FIG. 1, the connector 1 comprises a solid body 5 formed from solid material that includes a plurality of channels 6, with each channel 6 being a gap in the solid material of the solid body 5. More specifically, the gaps that form the channels 6 extend upward 101 from the bottom end 7 of the connector 1, with the length of each gap being less than the length of the connector 1 in the top 101 to bottom 102 dimension (the length of each gap also being the height 215 of each channel, discussed later herein). Each channel 6 is positioned laterally or medially relative to every other channel 6.

In FIG. 1, four channels 6 are shown, although only one channel 6 is numbered in the figure, in order to maintain clarity of the figure. The gaps that form each channel 6 also result in a number of fingers 8 being defined in the connector 1, such that any two adjacent channels 6 are separated by a finger 8, i.e. the fingers 8 are the solid material of the connector 1 disposed between any two adjacent gaps that make the separation of two adjacent gaps apparent. Thus, the connector 1 comprises one fewer finger than channels 6. It is noted that a rear portion of each channel 6 (including a rear portion of the conductor receiving opening 19) and a rear portion of each finger 8 are formed in the main compartment 3, and that a front portion of each channel 6 (including a front portion of the conductor receiving opening 19) and a front portion of each finger 8 are formed in the front cover 4. Thus, when the front cover 4 is coupled to the main compartment 3 during the manufacturing process in order to form the fully assembled connector 1, the front portions of the channels 6 and fingers 8 align with the rear portions of the channels 6 and fingers 8. In FIG. 2, the channels 6 are numbered with reference numbers 6A and 6B, and it should be noted that the channels 6A and 6B can be referred to generally with the reference number 6. (In FIG. 2, although only the main compartment 3 of the connector 1 is shown, the features of the main compartment 3 are numbered with the reference numbers used in FIG. 1 for the fully assembled connector 1.) The channels 6A are the lateral-most channels 6, i.e. those channels 6 which are adjacent to only one other channel 6. The channels 6B are the medial channels, which are the channels positioned between the lateral channels 6A.

It is noted that the bottom end 7 of the connector 1 includes the bottom surfaces (not separately numbered) of the fingers 8, and that the bottom end (not separately numbered) of each channel 6 is flush with the bottom end 7 of the connector 10. Each channel 6 is structured to receive one conductor 2, as shown in FIG. 1. An exemplary embodiment of the connector 1 includes four channels 6, as it is expected that most electrical wiring devices require connections to as many as four conductors 2, however, it will be appreciated that a connector 1 can be produced with more or fewer than four channels 6 without departing from the scope of the disclosed concept.

Each channel 6 has a lateral width 211 (numbered in FIG. 2) slightly wider than the diameter of each conductor 2, and has a depth 213 (numbered in FIG. 1) in the front 103 to rear 104 dimension that is greater than the lateral width 211. Each channel 6 also has a height 215 (numbered in FIG. 2) in the top 101 to bottom 102 dimension that is greater than the lateral width 211. As will be discussed further later herein in connection with FIGS. 4-6, proportioning the channels 6 such that the depth 213 of each channel 6 exceeds its lateral width 211 and such that the height 215 of each channel exceeds its lateral width 211 affords a conductor 2 inserted within a channel 6 greater freedom of movement than if the depth 213 and height 215 were smaller.

As can be seen in FIG. 1, the depth 213 of each channel 6 is less than the depth of the solid body 5, such that each channel 6 extends from the rear surface 11 of the connector 1 toward the front surface 13 of the connector 1 without reaching the front surface 13. This results in each channel 6 defining a front channel surface 15. Each channel 6 further defines a channel wall 17, with at least a portion of each channel wall 17 being part of the adjacent finger(s) 8. A conductor receiving opening 19 is formed in the top side of each channel wall 17 such that each conductor receiving opening 19 is adjacent to the corresponding front channel surface 15. Each conductor receiving opening 19 is generally disposed in a plane coplanar that extends in the front 103 to rear 104 dimension and thus is orthogonal to the top 101 to bottom 102 dimension. It will be appreciated that the conductor receiving openings 19 in FIG. 1 are obscured from view by the conductors 2 inserted into each of the conductor receiving openings 19. In each channel 6, the conductor receiving opening 19 extends rearward 104 from front channel surface 15 without extending all the way to the rear surface 11 of the connector 1. Each conductor receiving opening 19 is structured to receive one end of a conductor 2, with each conductor receiving opening 19 being circular and having a diameter slightly larger than that of each of the conductors 2, so that one end of a conductor 2 can be snugly received within the conductor receiving opening 19 without compressing the conductor 2. It is noted that the top end (not separately numbered) of each channel 6 is adjacent to the conductor receiving opening 19.

As previously stated, the connector 1 is structured to enable the conductors 2 to be inserted into the interior of the connector 1 so that each conductor 2 can be electrically connected to an electrical contact disposed within the interior of the connector 1. Specifically, for each channel 6, there is a corresponding electrical contact disposed in the interior of the connector 1 such that there is a plurality of electrical contacts corresponding in number to the plurality of channels 6. A first end of each conductor 2 can be inserted into the interior of the connector 1 so that the first end of the conductor 2 can connect to the interior electrical contact corresponding to the channel 6, and such that the rest of the conductor 2 runs to the exterior of the connector 1 through the rear portion of the conductor receiving opening 19.

Reference is now made to FIG. 3, which shows how the connector 1 can be used to electrically connect an electrical wiring device to the conductors 2 of a building. In FIG. 3, the connector 1 and conductors 2 are portrayed as being free from any space constraints (i.e. not positioned within a wall box or other constrained space), with the conductors 2 being able to fall freely out of the bottom end 7 of the connector 1. In viewing FIG. 1 in conjunction with FIG. 3, it can be seen that the channels 6 are structured such that, when any conductors 2 are contained within the connector 1 and the connector 1 is not subjected to any space constraints (i.e. not positioned within a wall box or other constrained space), the portion of each conductor 2 that is positioned between the conductor receiving opening 19 and the bottom end of the channel 6 lies adjacent to the front channel surface 15.

Referring still to FIG. 3, in order to connect an electrical wiring device to the conductors 2, the connector 1 must first be coupled to a wire management housing 70 (referred to hereinafter as the "housing 70" for brevity). The connector 1 and the housing 70 each include a plurality of electrical contacts. The connector 1 is structured such that, when the first ends of the conductors 2 are inserted into the connector 1, each conductor 2 is electrically connected to a unique electrical contact of the connector 1. The connector 1 and housing 70 are each structured such that, when the connector 1 is coupled to the housing 70, each electrical contact of the connector 1 is electrically connected to a corresponding electrical contact of the housing 70, enabling the housing 70 to electrically connect to any conductors 2 contained by the connector 1.

Continuing to refer to FIG. 3, the housing 70 is further structured to be coupled to an electrical wiring device 80. The electrical wiring device 80 shown in FIG. 3 is portrayed as a snap switch faceplate, but it should be noted that the snap switch faceplate shown in FIG. 3 is intended to be a non-limiting illustrative example of the type of electrical wiring device 80 for which the connector 1 can be used for wire management. The electrical wiring device 80 includes a plurality of electrical contacts, and the electrical wiring device 80 and housing 70 are each structured such that, when the electrical wiring device 80 is coupled to the housing 70, each electrical contact of the electrical wiring device 80 is electrically connected to a corresponding electrical contact of the housing 70, thus enabling the electrical wiring device 80 to electrically connect, through the housing 70, to any conductors 2 contained by the connector 1. In addition, the electrical wiring device 80 includes a number of mounting brackets 82 that can be used to fasten the electrical wiring device to a surface such as a building wall.

Figure 4:
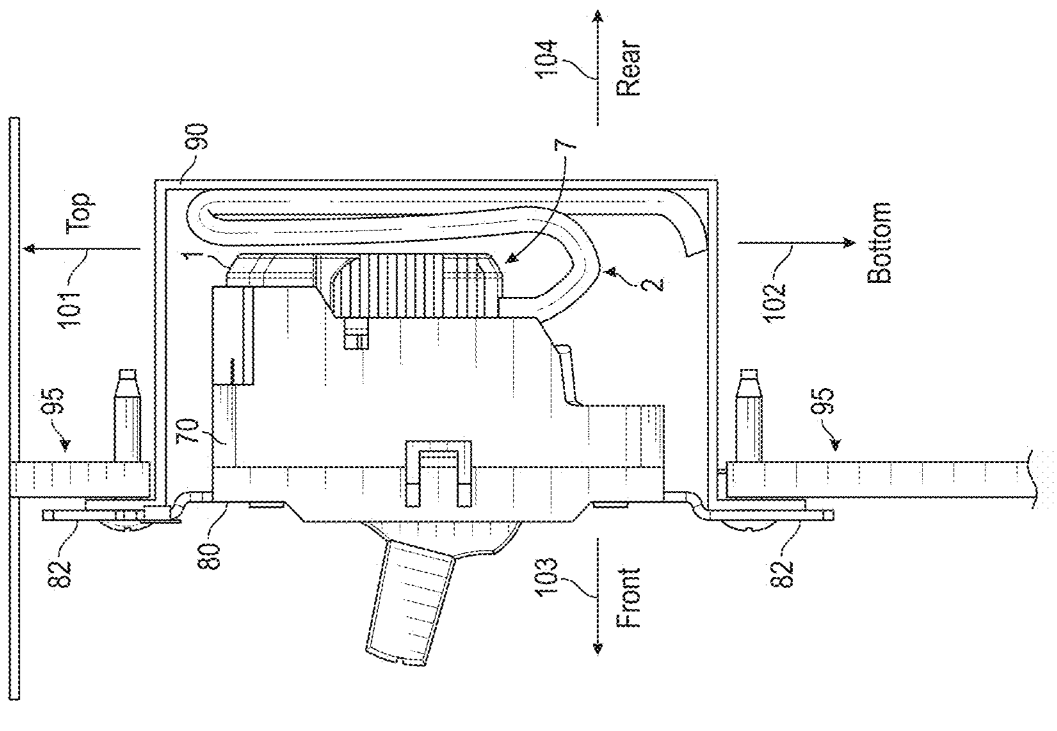
FIG. 4 is an isometric side view of the arrangement shown in FIG. 3 inserted within a wallbox installed within drywall, with a number of conductors contained within the wire management connector and disposed in a first position, in accordance with an example embodiment of the disclosed concept.
Figure 5:
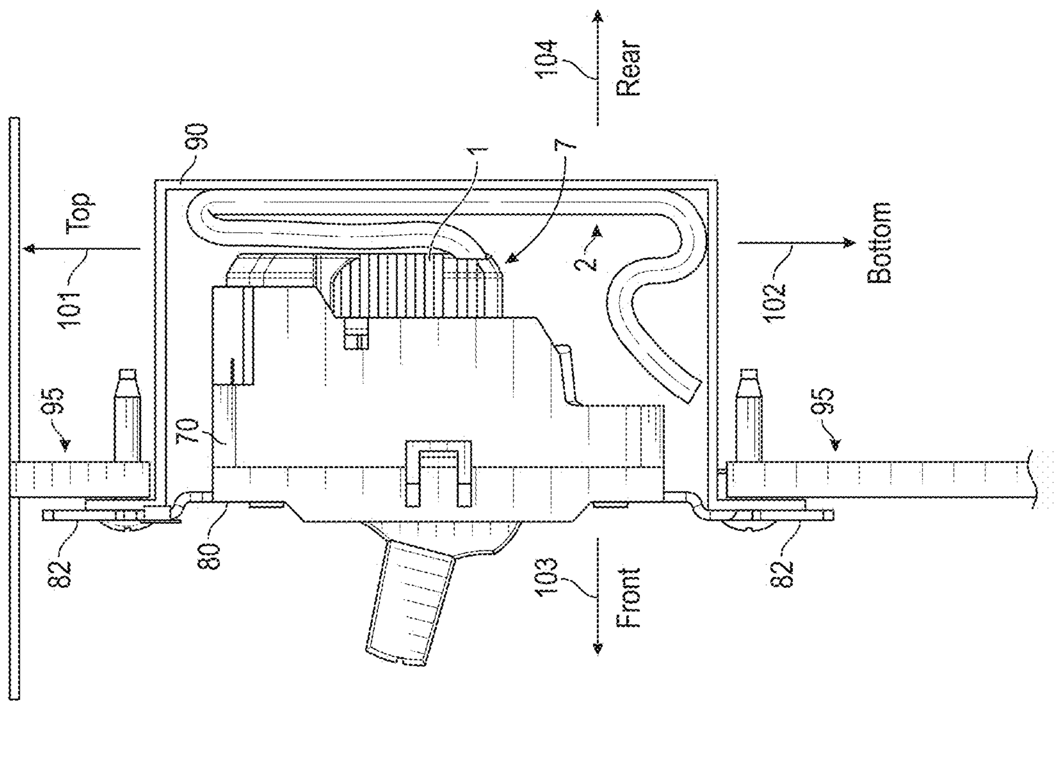
FIG. 5 is an isometric side view of the arrangement shown in FIG. 4, with the number of conductors disposed in a second position, in accordance with another example embodiment of the disclosed concept.
Figure 6:
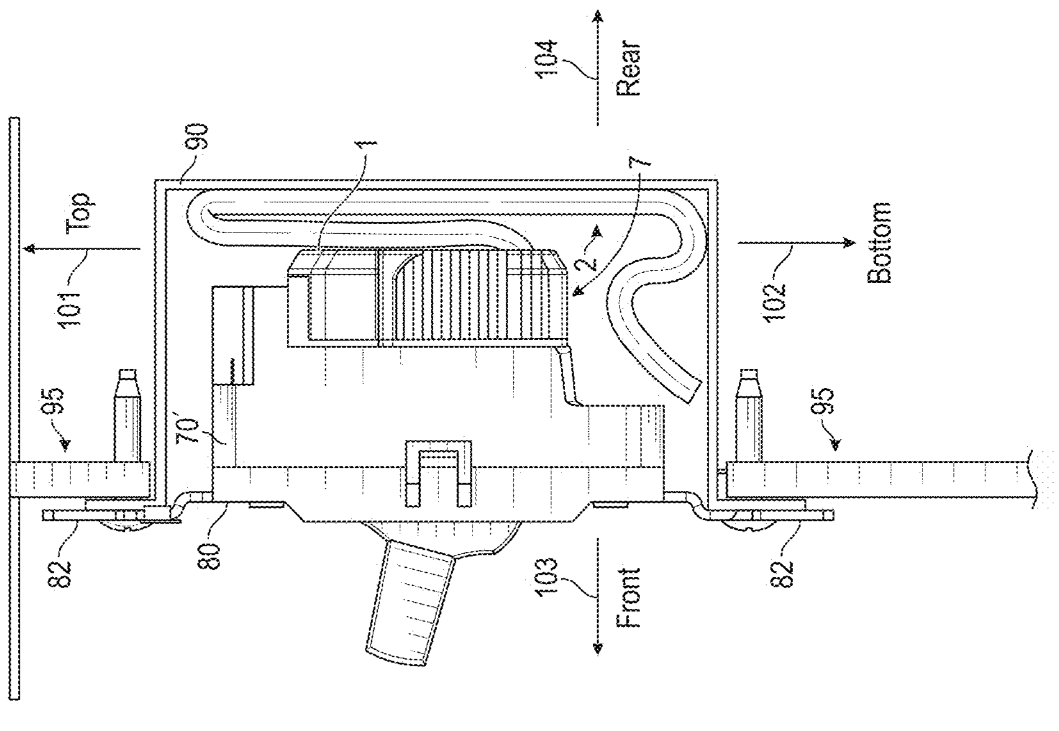
FIG. 6 is an isometric side view of an installation similar to that shown in FIG. 4, with a slightly different housing than that shown in FIG. 4 and with the number of conductors disposed in a third position, in accordance with a further example embodiment of the disclosed concept.

The advantageous features of the disclosed connector 1 will now be detailed in conjunction with FIGS. 4-6, as the advantageous features of the connector 1 arise from the freedom of movement afforded the conductors 2 by the structural design of the channels 6. FIGS. 4 and 5 show how the arrangement of FIG. 3 can be installed within a wall box 90 (also known as a junction box) and coupled to the wall 95 of a building, and FIG. 6 shows how an arrangement similar to that of FIG. 3 can be installed within a wall box 90 and coupled to the wall 95 of a building. In each of FIGS. 4-6, only one conductor 2 is visible, for clarity of illustration. The bottom surface 7 of the connector 1 is numbered in each of FIGS. 4-6 in order to provide a frame of reference for the differences in the position of the conductor 2 between each of FIGS. 4, 5, and 6.

In FIG. 4, the conductor 2 runs from the conductor receiving opening 19 (not visible in the figure) out of the bottom end of the channel 6 and out of the bottom end 7 of the connector 1. Similarly to the disposition of the conductors 2 as shown in FIG. 3, the portion of each conductor 2 that is positioned between the conductor receiving opening 19 and the bottom end of the channel 6 lies adjacent to the front channel surface 15. (As previously stated, the bottom end of each channel 6 is flush with the bottom end 7 of the connector 10.) In FIG. 5, the conductor 2 runs from the conductor receiving opening 19 (not visible in the figure) upward 101 of the bottom of the channel 6 and out of the rear side of the connector 1.

It is noted that the housing 70 shown in FIGS. 4 and 5 is the same as that shown in FIG. 3, but that the housing 70' shown in FIG. 6 has a slightly different structure than the housing 70 shown in FIG. 3. As a result, the connector 1 gets coupled to the housing 70' in a different manner than that in which the connector 1 gets coupled to the housing 70, which results in the connector 1 being positioned further downward 102 on the housing 70' than on the housing 70. In FIG. 6, the conductor 2 runs out of the top end of the channel 6 (as previously stated, the top end of each channel 6 is adjacent to the conductor receiving opening 19) and out of the rear side of the connector 1, similarly to the disposition of the conductor 2 in the arrangement shown in FIG. 5.

In comparing FIGS. 4, 5, and 6, it can be appreciated that the depth 213 (FIG. 1) and height 215 (FIG. 2) of the channels 6 enables the arrangement of the connector 1, housing 70, and electrical wiring device 80 to be placed within a wall box 90 without having to precisely position the conductors 2 in a manner that prevents the conductors 2 from becoming unduly stressed (e.g. by being compressed) at the point at which they exit their respective conductor receiving openings 19. In particular, the depth 213 enables the conductors 2 to move in the frontward 103 to rearward 104 dimension, and the height 215 enables the conductors 2 to move in the top 101 to bottom dimension 102.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A connector structured to provide wire management for a plurality of conductors electrically connected to a power source and to electrically connect an electrical wiring device to the plurality of conductors, the connector comprising:

a solid body that includes a plurality of channels, the solid body being formed from solid material, wherein the solid body extends in a top to bottom dimension, a front to rear dimension, and a medial to lateral dimension that are all orthogonal to one another, wherein the solid body is shortest in the front to rear dimension, wherein the plurality of channels are aligned in the medial to lateral dimension, wherein each channel is a gap in the solid material, the gap being surrounded by a channel wall, wherein each gap extends upward from a bottom end of the connector in the top to bottom dimension such that a height of each channel is less than a length of the connector in the top to bottom dimension, wherein a conductor receiving opening is formed in each channel wall, wherein each conductor receiving opening is structured to receive a first end of each conductor, wherein the connector is structured to secure the first end of each conductor within an interior of the connector while enabling a second end of each conductor to be disposed externally to the connector and externally to the electrical wiring device so that the second end can be directly coupled to the power source, wherein, for each channel, the height of the channel is greater than a lateral width of the channel, the lateral width being in the medial to lateral dimension, and wherein, for each channel, a depth of the channel is greater than the lateral width of the channel, the depth of the channel being in the front to rear dimension.

2. The connector of claim 1, wherein each conductor receiving opening is formed at a top end of each channel wall.

3. The connector of claim 1, further comprising:

a number of fingers, wherein each finger is formed from the solid material, and wherein each finger separates two adjacent channels of the plurality of channels.

4. The connector of claim 3, wherein the solid body includes one less finger than channels.

5. The connector of claim 1, wherein the connector comprises a rear surface and a front surface, the front surface being disposed opposite the rear surface, wherein, for each channel, the depth of the channel is less than a depth of the solid body, such that each channel extends from the rear surface toward the front surface without reaching the front surface.

6. The connector of claim 1, wherein the connector comprises a main compartment and a front cover, wherein, for each channel, a rear portion of the channel is formed in the main compartment and a front portion of the channel is formed in the front cover.

7. The connector of claim 6, wherein, for each channel, the rear portion of the channel includes a rear portion of the conductor receiving opening and the front portion of the channel includes a front portion of the conductor receiving opening.

8. The connector of claim 1, wherein the conductor receiving opening of each channel wall extends in the medial to lateral dimension and in the front to rear dimension.

9. The connector of claim 1, wherein the solid body comprises a bottom end with a bottom surface, the bottom surface being a surface disposed furthest in a bottom direction in the top to bottom dimension, and wherein a bottom end of each channel is flush with the bottom surface of the connector.

* * * * *